Oct. 12, 1971 W. PIEPER 3,611,781
MULTI-STAGE PRESS WITH A PLURALITY OF MATRICES AND DIES
Filed June 20, 1969 6 Sheets-Sheet 1

INVENTOR
Willi Pieper

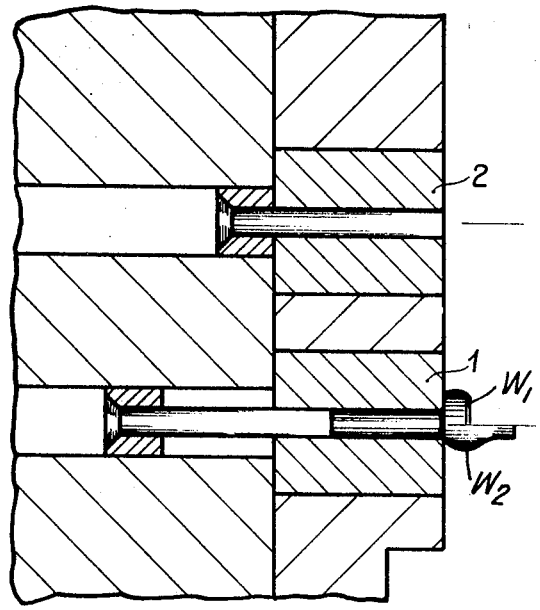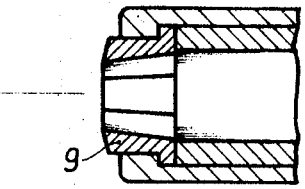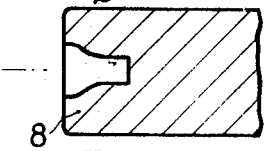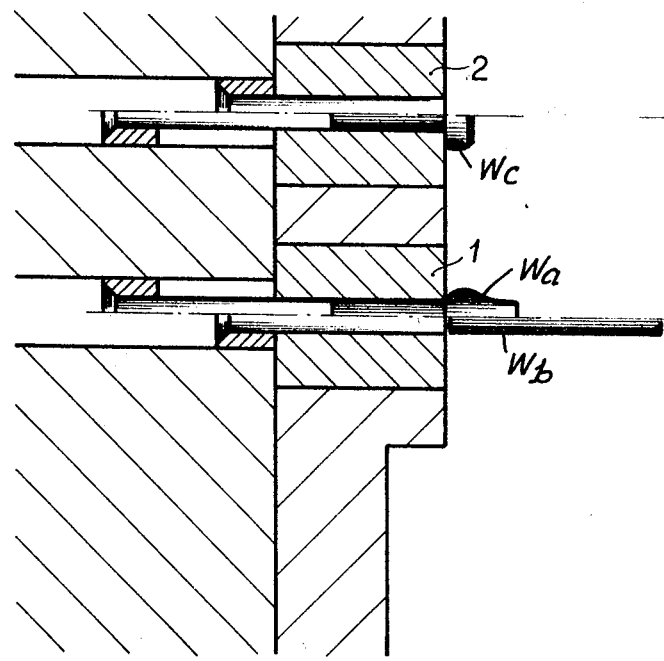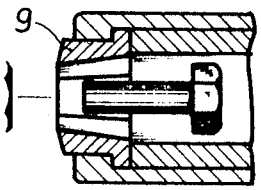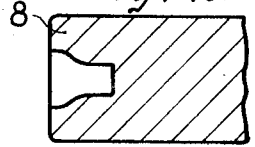

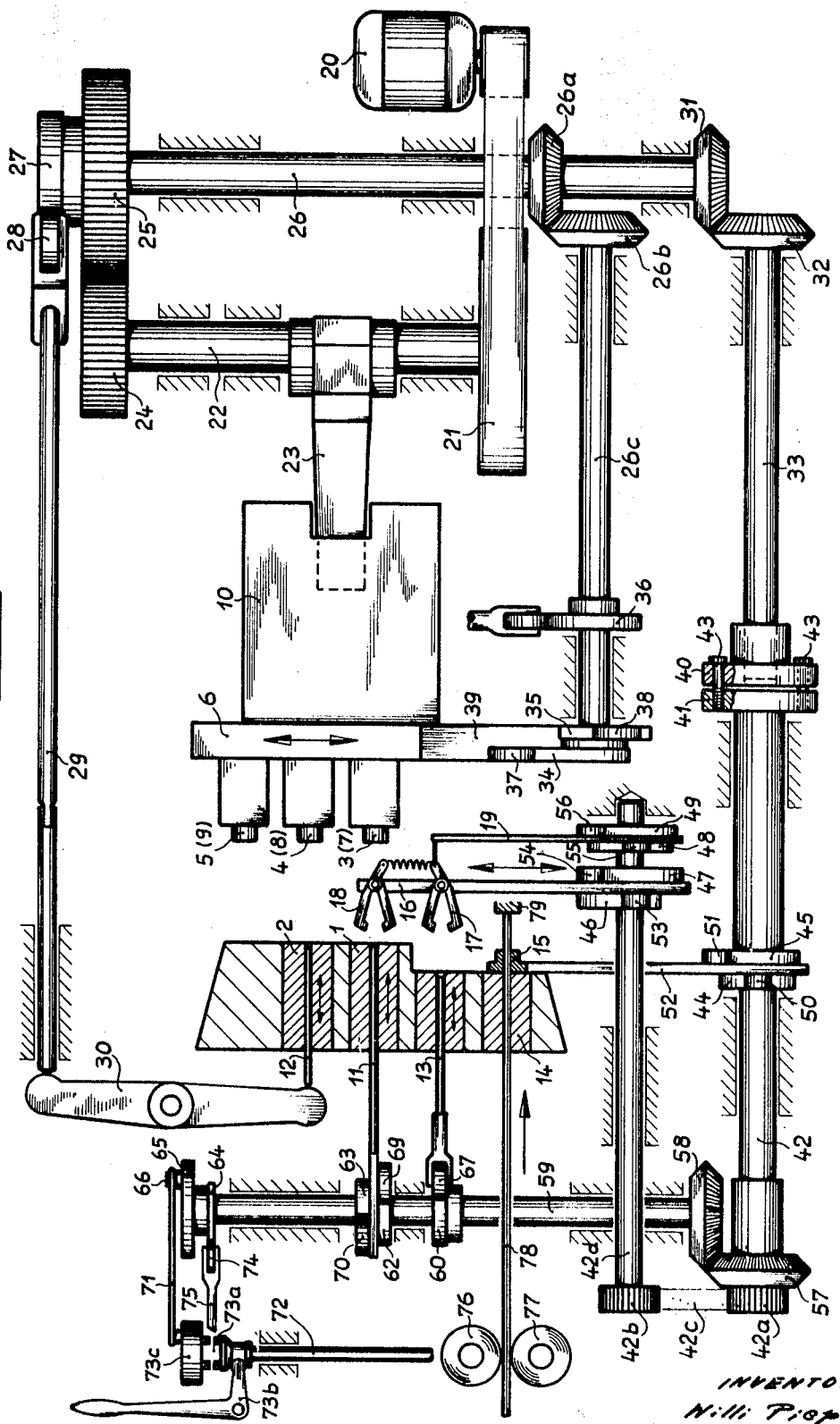

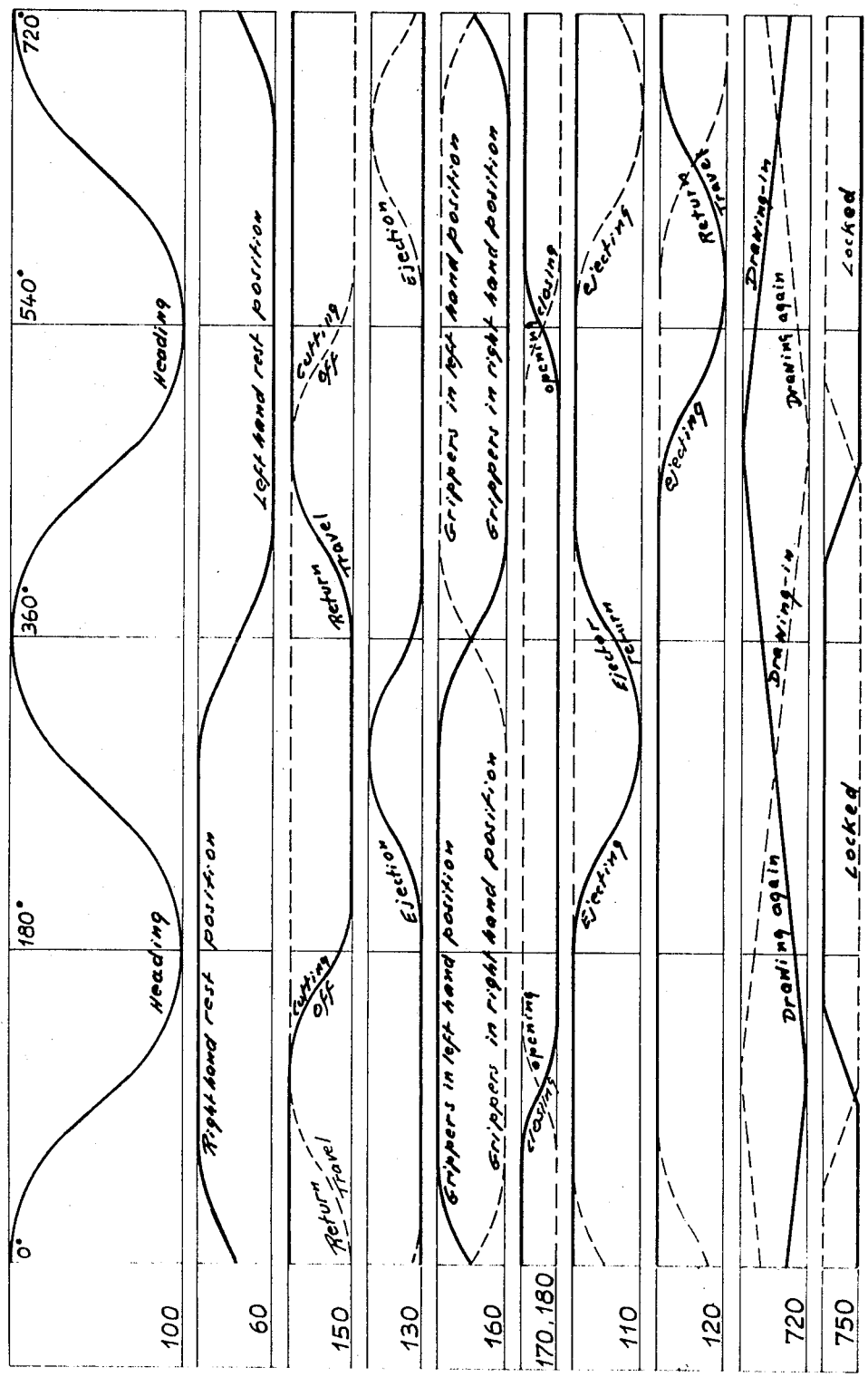

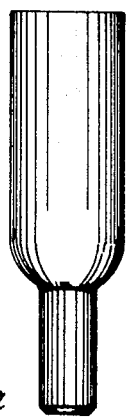
Fig. 7a  DIE 1
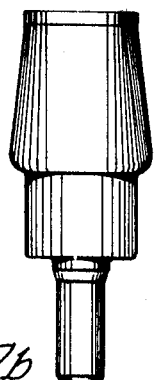
Fig. 7b  DIE 2
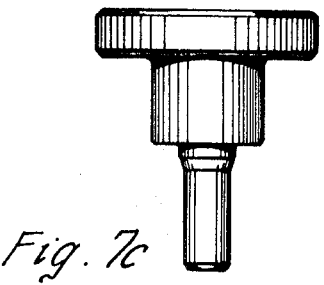
Fig. 7c  DIE 2
DIE 1
Fig. 8a
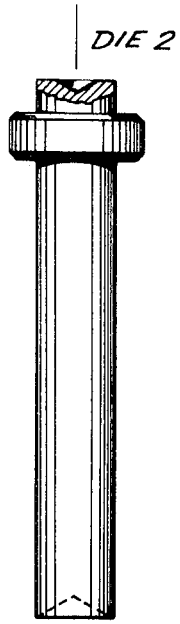
DIE 2
Fig. 8b
DIE 2
Fig. 8c Oct. 12, 1971    W. PIEPER    3,611,781
MULTI-STAGE PRESS WITH A PLURALITY OF MATRICES AND DIES
Filed June 20, 1969    6 Sheets-Sheet 6

DIE 1

DIE 1

DIE 2

DIE 1

DIE 1

DIE 2

INVENTOR
Willi Pieper
BY

United States Patent Office 3,611,781
Patented Oct. 12, 1971

3,611,781
MULTI-STAGE PRESS WITH A PLURALITY OF MATRICES AND DIES
Willi Pieper, Wuppertal, Germany, assignor to Gebr. Hilgeland, Ronsdorf, Germany
Filed June 20, 1969, Ser. No. 835,158
Claims priority, application Germany, June 21, 1968, P 17 52 610.2
Int. Cl. B21d 28/02
U.S. Cl. 72—339          5 Claims

ABSTRACT OF THE DISCLOSURE

A multi-stage press with two matrices and three dies arranged on a die holder adapted to oscillate back and forth on a press carriage, in which two adjacent dies machine each workpiece in one in two succeeding pressing strokes while when looking in the direction of the driving train of the press the drive motor drives the crankshaft for the press carriage and through a step-down transmission with a step-down ratio of 1:2 drives the oscillating device for the die holder as well as those control means of the press which are located on the machine frame at the side of the matrix for pulling in the wire, shearing the wire, ejecting the blank from the shearing means, and which furthermore bring about the transport of the blank or the premachined workpiece to the first and second matrix and also bring about the ejection of the workpiece from the first matrix. In the driving train of the press behind the crankshaft and behind the output for the oscillating device in the driving train for the above mentioned control means there is provided a disengageable clutch through the intervention of which the position of the control means is variable with regard to the position of the carriage by an angle of 360° of the crankshaft for the carriage and with regard to the die holder is variable by 180° of the driving shaft therefor by rotating the driving elements located in the driving train behind the clutch with regard to the driving elements located in the driving train ahead of the clutch.

---

Figure 1A:
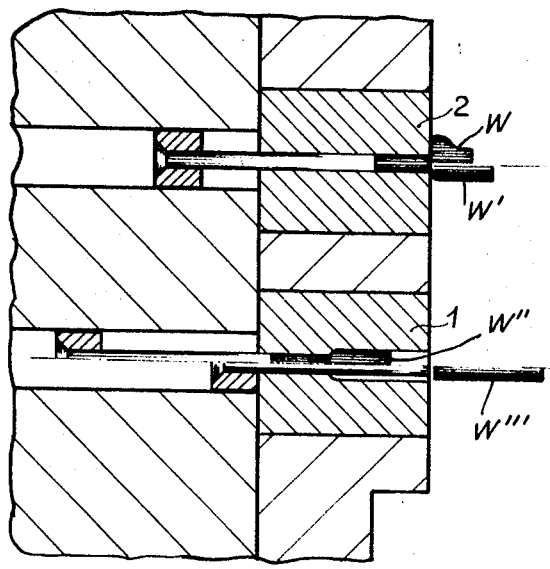

The present invention relates to a multi-stage press with two matrices and three dies arranged on a die holder adapted to oscillate back and forth on a press carriage and, more specifically, concerns a multi-stage press of this type in which two adjacent dies machine each workpiece in one matrix successively in two succeeding pressing strokes while in the driving mechanism for the press the drive motor drives the crankshaft for the press carriage and through a step-down transmission with a step-down ratio of 1:2 drives the oscillating device for the die holder as well as those control means of the press which are located on the machine frame at the side of the matrix for pulling-in the wire, shearing the wire, ejecting the blank from the shearing means, and which furthermore bring about the transport of the blank or the premachined workpiece to the first and second matrix and also bring about the ejection of the work piece from the first matrix.

A so-called triple pressure two-matrix cold press has become known and is disclosed in the German periodical "Draht," 1966, No. 8, p. 650. This press machines a work piece in three succeeding working operations. With this known press, a blank is extrusion pressed in the first matrix and in the second matrix is initially upset and further upset. For these working operations the press carriage is provided with an oscillating die holder carrying three dies.

The above referred to known press has, however, the drawback that it can be used only for the production of such work pieces in which the work pieces are machined once in the first matrix and twice in the second matrix. This means that this known press can produce substantially only such parts which require first an extrusion operation and subsequently two upsetting operations. In other words, the said known press can not produce work pieces with which during the first or the first two working operations an upsetting of the blank is required and in the second operation merely a post-forming is effected as, for instance, chamfering, burring, or the deep drawing of an inner hexagonal contour in a bolt head. The manufacture of work pieces of the last mentioned type is not possible on the above mentioned heretofore known machines because the control members of the press for the drawing-in of the wire, the ejection of the sheared-off blank, the transverse transport of the blank or the premachined work piece to the first or second matrix and the ejection of the work piece from the first matrix are with respect to the rhythm of the press carriage so tuned to the oscillating die holder that only the manufacture of such work pieces is possible according to which the blank is machined once in the first matrix and twice in the second matrix. In order to be able to produce work pieces which differ from each other by these manufacturing processes, it has been necessary heretofore to provide two separate presses which are designed in conformity with the respective manufacturing process.

It is, therefore, an object of the present invention to provide a multi-purpose press which will make it possible on said press to produce work pieces which are machined once in the first matrix and twice in the second matrix, and also to produce work pieces which can be machined twice in the first matrix and once in the second matrix.

Figure 1B:
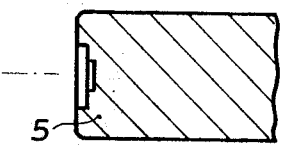
Figure 1C:
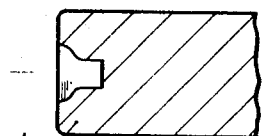
Figure 1D:
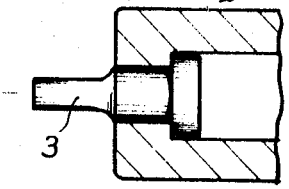

This object and other objects and advantages of the invention will appear more clearly from the following specification in connection with the accompanying drawings, in which:

FIGS. 1a–d illustrate in connection with the press according to the invention, when used as an extrusion pressing machine, an extrusion pressing die, two upsetting dies and matrices located opposite said dies with work pieces therein, while showing in part the shape of the work piece shortly prior to and shortly after the first pressing stroke, the die holder occupying its right-hand abutting position.

Figure 2A:
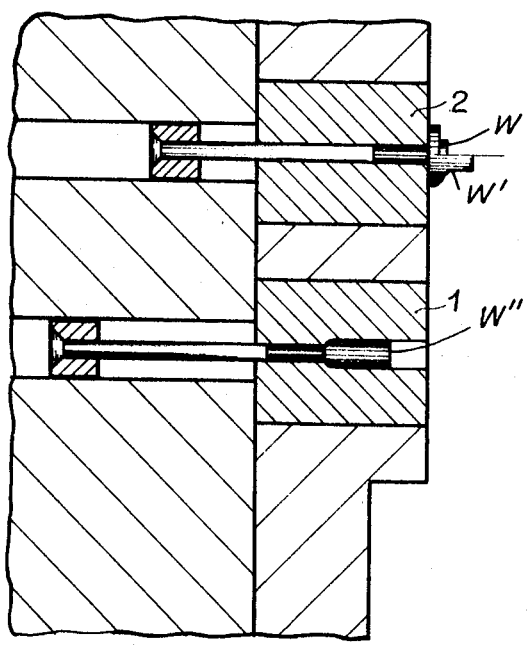
Figure 2B:
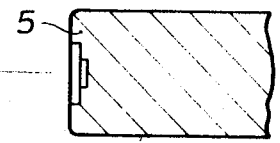
Figure 2C:
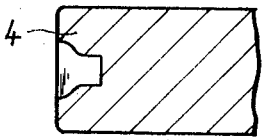
Figure 2D:
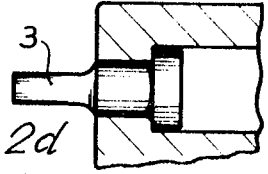

FIGS. 2a–d illustrate the press according to FIGS. 1a–d when the die holder occupies its left-hand abutting position, the shape of the work piece being indicated shortly prior to and shortly after the second pressing stroke.

FIGS. 3a–d illustrate the press according to the invention when used as a burring machine with the upsetting dies and the burring die occupying the right-hand abutting position while the work pieces in the matrix are indicated in part as to their shape shortly prior to and shortly after the first pressing stroke.

FIGS. 4a–d illustrate the press of FIGS. 3a–d in the aleft-hand abutting position and also show the work pieces in the matrix in their shape shortly prior to and shortly after the second pressing stroke.

FIG. 5 diagrammatically illustrates the essential elements of the press according to the invention with the pertaining driving means.

FIG. 6 illustrates a diagram representing the course of the movement of the various control elements with respect to time and relative to the stroke of the press and also with regard to the position of the die holder mounted on the press carriage, the dash lines indicating the employment of the press as extrusion pressing machine and the full lines indicating the employment of the press as burring machine.

FIGS. 7a–c and FIGS. 8a–c show samples of work pieces which respectively have been machined in the first die once and in the second matrix twice.

Figure 9A:
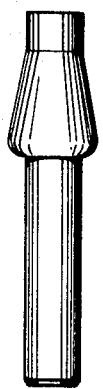
Figure 9B:
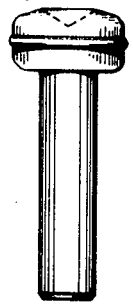
Figure 9C:
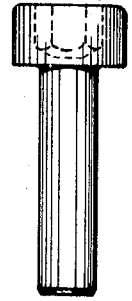
Figure 10A:
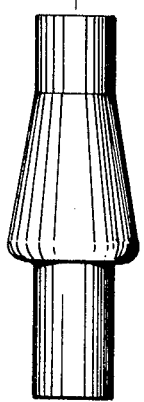
Figure 10B:
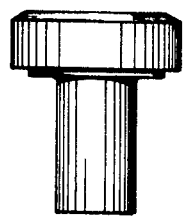
Figure 10C:
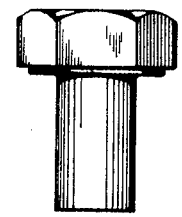

FIGS. 9a–c and FIGS. 10a–c show samples of work pieces which respectively have been machined in the first dies twice and in the second dies once.

The problem underlying the present invention has been solved by providing a disengageable clutch in the driving mechanism of the press past the crankshaft and past the output drive for the oscillating device in the drive for the control members. By means of said disengageable clutch it is possible to vary the position of the control members relative to the position of the press carriage by 360° or with regard to the position of the die holder by 180° of the respective drive shaft in conformity with a press stroke by turning the driving elements which in the driving mechanism are located past the clutch relative to the driving elements located ahead of the clutch.

Referring now to the drawings in detail, FIG. 1 shows the two matrices 1 and 2 arranged one adjacent the other and pertaining to the multi-stage press according to the invention. Opposite the matrices 1 and 2 there are provided the dies 3, 4 and 5. The dies 3, 4 and 5 are fixedly arranged on the die holder 6 as shown in FIG. 5. In FIG. 1, the dies 3, 4 and 5 occupy their right-hand abutting position with regard to the matrices 1 and 2. Work pieces are located in the matrices 1 and 2. The work pieces are so illustrated as to show the same during various phases of the manufacturing process. Therefore, one half of the work piece $w$ is shown before and one half $w'$ is shown after the next following pressing stroke. In the illustrated instance, the die 3 is an extrusion pressing die, whereas the dies 4 and 5 form upsetting dies. Half portions of work pieces $w''$ and $w'''$ respectively in matrix 1 represent the result of sequential die use.

According to FIG. 2, the dies 3, 4 and 5 are shown in their left-hand abutting position with regard to the matrices 1 and 2. The work piece which is located in the matrix 2 for illustration has one upper half $w$ shown shortly before and another lower half $w'$ shown shortly after the next following pressing stroke, whereas the work piece $w''$ in the matrix 1 is not machined during the next following pressing stroke.

When employing a multi-stage press according to the invention as extrusion pressing machine, the work piece in the matrix 1 is machined once whereas the work piece in the matrix 2 is machined twice. In the matrix 1 the work piece blank is deformed by extrusion, whereas in the matrix 2 the head of the work piece is initially upset and further upset.

According to the embodiment illustrated in FIGS. 3 and 4, the multi-stage press according to the invention is employed as burring machine. In this instance the work piece blank is machined in the matrix 1 twice and in the matrix 2 only once.

When employing the multi-stage press according to the invention as burring machine, according to FIG. 3, for instance, the dies 7, 8 and 9 are provided. The dies 7 and 8 alternately machine the work piece in the matrix 1 while the die 8 initially upsets the work piece $W_1$ (upper half only is shown); and the die 7 further upsets the work piece $W_2$ (lower half only is shown), whereas the die 9 burrs the work piece in the matrix 2 during the third machining operation.

FIG. 3 shows a die holder 6 (see FIG. 5) with the dies 7, 8 and 9 in their right-hand abutting position, whereas FIG. 4 illustrates the die holder with the dies in their left-hand abutting position with regard to the matrices 1 and 2. The work piece or work piece blank in the matrix 1 is again illustrated so that one lower half $W_a$ is shown prior to and the other upper half $W_b$ is shown shortly after the next following pressing stroke. According to FIG. 4, the work piece $W_c$ in the matrix 2 is shown prior to the third machining operation, namely the burring operation. Following the burring operation or already during the burring operation, the work piece is ejected from the matrix 2 through the die 9.

FIG. 5 illustrates the most important features of the multi-stage press according to the invention. As will be seen from FIG. 5, the die holder 6 is mounted on the press carriage 10. The die holder 6 carries the dies 3, 4 and 5 and 7, 8 and 9. Depending on the position of the oscillating die holder 6, the dies 3 and 4, and 7 and 8 or the dies 4 and 5, and 8 and 9 are located opposite the matrices 1 and 2. The matrices 1 and 2 are fixedly arranged in the machine frame not shown. In the matrices 1 and 2 there are provided displaceably journalled ejectors 11, 12. Displaceably journalled in the machine frame is an ejector 13. Moreover, in the machine frame there are provided guiding means for the wire to be sheared off. Within the area of the ejector 13 and the guiding means 14 there is movably arranged a shearing device 15. Within the region of the ejector 13 and the matrix 1 there is provided a transporting device 16 with grippers 17 and 18. The grippers 17 and 18 are connected to an actuating linkage system 19.

The drive of the movable machine elements of the multi-stage press according to the invention is effected by a motor 20 which through a stepdown transmission drives the flywheel 21. The flywheel 21 is connected to the crankshaft 22 journalled in the machine frame which through the intervention of a connecting rod 23 moves back and forth the press carriage 10. The rotary movement of the flywheel 21 or of the crankshaft 22 is by means of a stepdown transmission 24, 25 which cuts the number of revolutions of the crankshaft in half, conveyed to the shaft 26. Keyed to shaft 26 is a cam disc 27 which through the intervention of a roller 28 actuates an actuating rod 29, and through an actuating lever 30 actuates the ejector 12 in the matrix 2. Shaft 26 drives through bevel gears 26a and 26b a shaft 26c. At the outer end of the shaft 26c there is provided a double cam disc 34, 35 on which the rollers 37 and 38 roll, said rollers being rotatable in the pivot plate 39 whereby the back and forth movement of the die holder 6 is controlled. For controlling a possible offsetting ejecting device, shaft 26c may additionally be provided with a cam disc 36.

Shaft 26 furthermore drives the shaft 33 through bevel gears 31 and 32. Mounted on shaft 33 is a clutch with clutch sections 40 and 41. The clutch section 40 is fixedly connected to the shaft 33, whereas the clutch section 41 is fixedly connected to a further shaft 42. The clutch sections 40 and 41 are, for instance, by means of bolts 43 connected to each other and secured against rotation relative to each other. To shaft 42 there are keyed cam discs 44 and 45. The cam discs 44 and 45 drive an actuating linkage 52 through rollers 50 and 51. The actuating linkage 52 moves the shearing device 15 alternately in front of the guiding means 14 for the wire to be pulled in and to be cut and moves the sheared off wire into a position in front of the ejector 13. Shaft 42d is driven through gears 42a and 42b by means of a belt 42c. Mounted on shaft 42d are cam discs 46 and 47 and 48 and 49. The cam discs 46 and 47 are adapted through the intervention of rollers 53 and 54 to drive the transporting device 16 with the grippers 17 and 18. The actuating linkage 19 for the gripper arms is driven through the intervention of cam discs 48 and 49 and rollers 55 and 56.

Shaft 42 through bevel gears 57 and 58 drives a further shaft 59 having keyed thereto cam discs 60, 62, 63 and 64. Fixedly connected to shaft 59 is furthermore a disc 65 with a crank pin 66. The cam disc 60 through a roller 67 actuates the ejector 13. The cam discs 62 and 63 through rollers 69 and 70 act upon the ejector 11 in matrix 1. By means of disc 65 with the crank pin 66 and a connecting rod 71, a feeding device 72 for the wire pull-in is driven. The feeding device 72 has pull-in rollers 76 and 77 for pulling the wire 78 through the guiding means 14 and in front of the abutment 79. The pull-in rollers 76, 77 are connected to the connecting rod 71 by means of a manually operable clutch 73a with the actuating lever 73b and by means of a roller clutch 73c acting in conformity with the principle of a free wheel drive. A cam disc 64 through the intervention of a roller 74 and an actuating rod 75 controls a locking of the clutch 73a. This locking will prevent the clutch 73a from being actuated while a wire 73 is being pulled in. In this way it will be assured that with a pull-in or threading operation always the full wire length is pulled in which is necessary for producing a work piece.

The operation of the multi-stage press according to FIG. 5 will now be described in connection with the diagram of FIG. 6 with the assumption that the press is employed as extrusion pressing machine. For this case, those curves apply which are shown in dash lines in the diagram.

In the diagram of FIG. 6 the curve 100 designates the course of the press carriage 10 with regard to the rotation of the crankshaft 22 whereas the curve 60 represents the course of the die holder 6, and the curve 150 indicates the course of the shearing device 15. Furthermore, the curve 130 shows the course of the ejector 13, the curve 160 illustrates the course of the transporting device 16, the curve 170, 180 shows the course of the grippers 17, 18 and the curve 110 illustrates the course of the ejector 11. Finally, the curve 120 indicates the course of the ejector 12, the curve 720 shows the course of the conveying device 72, and the curve 750 illustrates the course of the actuating rod 75 for the locking of the clutch 73a.

The illustrations of FIG. 6 are based on the assumption that the press carriage 10 occupies its end position away from the matrices 1 and 2. At this time, the die holder 6 moves to its right-hand abutting position with regard to the position of the matrices 1 and 2. This abutting position has been reached by the die holder 6 prior to the occurrence of the next following pressing operation. During the first pressing stroke—at about an angle of rotation of 180° of the crank shaft 22—the extrusion pressing die 3 acts upon the blank in the matrix 1, whereas the initial upsetting die 4 initially upsets the head of the work piece in the matrix 2 (see FIG. 1). While the press carriage 10 is returned to its starting position, the die holder 6 is moved via pivoting plate 39 to its left-hand abutment position. During the then following second press stroke, merely the further-upsetting die 5 acts upon the head of the work piece in the matrix 2.

As will be seen from the curve 110 of the diagram of FIG. 6, the preformed work piece in matrix 1 is following the second press stroke ejected by means of the ejector 11. Simultaneously, the finish-formed work piece is ejected from matrix 2 by means of the ejector 12. This is clearly evident from curve 120. During the second press stroke, the shearing device 15 shears off the blank from the pulled in wire 78 in conformity with the course of the curve 150. Following the shearing operation, the shearing device 15 moves the blank in front of the ejector 13 which ejects the blank from the shearing device 15 in conformity with the curve 130 into the region of the gripper 17 of the transporting device 16. The course of movement of the grippers 17 and 18 which are simultaneously actuated through the intervention of the actuating rod 19 is clearly evident from the curves 170, 180. While the grippers 17 and 18 are closed and thus grasp the sheared off blank or the work piece preformed in the matrix 1, the transporting device 16 conveys the blank in front of the matrix 1 or conveys the preformed work piece in front of the matrix 2. Thereupon the grippers 17 and 18 open again and during the succeeding pressing stroke, the blank is extrusion pressed in matrix 1 whereas the preformed work piece is initially upset in the matrix 2.

During the first pressing stroke and the succeeding return movement of the press carriage 10, the wire 78 is by means of the pull-in rollers 76 and 77 of the feeding device 72 pulled through the guiding means 14 up to a position in front of the abutment 79 as is indicated by the curve 720. During this operation, the shearing device 15 is in front of the guiding means 14. In conformity with the curve 750, the roller clutch 73 is locked during the pulling in of the wire 78 in order to assure a complete pulling in of the wire if the clutch 78a is actuated.

The dash line curves in FIG. 6 illustrate, when employing the press as extrusion pressing machine, that the ejector 13, the ejector 11 and the ejector 12 become active after the second press stroke. The shearing device 15 shears off the blank during the second press stroke and shortly prior to the actuation of the ejector while the wire is passed through the guiding means 14 to the abutment 79 approximately from the period of the first press operation up to shortly prior to the start of the shearing operation.

There will now be explained the function of the multi-stage press according to the invention when the press is employed as so-called burring machine. The curves shown in full line in FIG. 6 refer to this type of employment.

With the burring machine, the work piece is machined twice in the matrix 1 and once in the matrix 2. Therefore, the dies 7 and 8 act upon the work piece in the matrix 1 whereas the die 9 acts upon the work piece in the matrix 2.

During the first press stroke, in conformity with the illustrations of FIG. 6, the die holder 6 occupies its right-hand abutment position. Accordingly, the die 7 acts upon the work piece in the matrix 1, whereas the die 8 is moved in front of the matrix 2 (see FIG. 3). The work piece in the matrix 1 is post-shaped by means of the die 7, half of the work piece being shown as to its shape shortly prior to and shortly after the first press stroke. The work piece which was previously in the matrix 2 and has been processed by the die 9 has been ejected prior to the first press stroke in conformity with the illustration of FIG. 6 because otherwise it would be in the range of movement of the die 8. Following the first press stroke, the die holder 6 pivots to its left-hand abutment position in conformity with the curve 60 (see FIG. 4). During the first press stroke, the shearing device 15 is actuated in conformity with the curve 150. After the first press stroke and after the blank has been sheared off, the ejector 13, the grippers 17 and 18 and the ejector 11 are actuated in conformity with the curves 130, 170, 180 and 110. After the grippers 17 and 18 have closed, the transporting device 16 will in conformity with the curve 160 and by means of the grippers 17 move the blank ejected from the shearing device 15 into a position in front of the matrix 1 while the work piece pre-shaped in matrix 1 is moved in front of the matrix 2. During the second press stroke, the blank in the matrix 1 is initially upset by means of the die 8, whereas the work piece in the matrix 2 is burred by means of the die 9. In order to aid the burring operation, it is advantageous to actuate the ejector 12 in conformity with the illustrated curve. In this way a clean burring will be realized. The work piece in the matrix 2 is thus ejected already during the second press stroke or shortly thereafter. This may be realized in a simple manner by adjustably connecting the cam disc 27 on the drive shaft 26. An adjusting or turning movement brings about the desired change in the curve 120. The pulling-in of the wire is effected during the second press stroke and the succeeding return movement of the press carriage 10 in conformity with the curve 720.

In view of the necessity that with the example according to FIGS. 1 and 2 the conveying device 72 with the locking mechanism, the ejector 11, the transporting device 16 with the grippers 17 and 18, the ejector 13 and the shearing device 15 have to be actuated at a time period which is offset relative to the embodiment of FIGS. 3 and 4 by 180° of the angle of rotation of the drive shaft 26, 33 for the die holder 6, it is usually not possible with multi-stage presses known as extrusion pressing machines to employ such presses also as so-called burring machines. The multi-stage press according to the invention, however, represents a multi-purpose machine by means of which it is possible to produce work pieces which are to be machined in three working operations, and this can be realized regardless of whether a two time machining of the work piece is to be effected in one or the other of two matrices. According to the invention, the shearing device 15, the transporting device 16 with the grippers 17 and 18, the ejector 11, the ejector 13 and the conveyor 72 are driven through the intervention of a shaft 42 which is connected to the drive shaft 26, 33 by means of a disengageable clutch 40, 41. This drive shaft 26, 33 actuates the die holder 6 with dies 3, 4, 5; 7, 8, 9 which die holder 6 is reciprocable on the press carriage 10.

When producing some work pieces, it is necessary that also one or more dies are equipped with an ejector. For purposes of actuating such ejector or ejectors, the shaft 26c is equipped with a cam disc 36 on which rollers (not illustrated) roll which are adapted through actuating levers to act upon the non-illustrated ejector in the respective die.

In FIGS. 7 and 8 there are illustrated a number of upset samples produced by upsetting by means of a multi-stage press according to the invention when the latter is used as extrusion pressing machine. The extrusion pressing process occurs in the matrix 1, whereas the succeeding forming operations occur in the matrix 2. According to FIG. 7, by performing an upsetting operation two times, a head of a certain form is upset on the work piece whereas with the example according to FIG. 8, after a certain head shape has been obtained by upsetting, a deep drawing of the head is effected during the second working operation effected in the matrix 2.

FIGS. 9 and 10 show upset samples as they may be produced when employing the multi-stage press according to the present invention as a burring machine. In the matrix 1, respective head shapes of the work piece are obtained by a twofold upsetting operation, whereas in the second matrix, in conformity with FIG. 9, the deep drawing of an inner hexagonal contour is effected and, in conformity with FIG. 10, the burring is effected to form an outer hexagonal head.

In addition to the illustrated upset samples, various other shapes of work pieces are possible which can be produced in three succeeding processing operations all carried out on the multi-stage press according to the invention. These various shapes are possible regardless of whether a multiple processing is effected in one or the other of the two matrices.

It is, of course, to be understood that the present invention is, by no means, limited to the particular showing in the drawings but also comprises any modifications within the scope of the appended claims.

What I claim is:

1. A multi-stage press which includes: machine frame means provided with means for receiving and holding a first matrix and a second matrix, carriage means, drive means including a crank shaft drivingly connected to said carriage means for reciprocating the same toward and away from said machine frame means, said drive means also including motor means in driving connection with said crank shaft and furthermore including output shaft means drivingly connected to said crank shaft, die holder means supported by said carriage means for receiving and holding dies for cooperation with matrices in said machine frame means, actuating means operatively connecting said output shaft means to said die holder means for reciprocating the same in a direction substantially perpendicular to the direction of reciprocation of said carriage means, control shaft means having a first section adjacent said output shaft means and connected thereto and also having a second section remote from said output shaft means, clutch means interposed between said first and second sections and operable selectively to interconnect said sections and to disconnect said control shaft sections from each other, said press also including cutting means for cutting wire and rod material to size for a workpiece, and also including feeding means for feeding wire and rod material to said cutting means said press further including transporting means for transporting cut material from said cutting means to an area between said die holder means and that portion of said frame means which receives said matrices, a plurality of control members associated with said matrices receiving frame means and said cutting means and feeding means and transporting means, and control means operatively connected to said control members and said second section of said control shaft means for controlling said control members, said first and second sections of said control shaft means being adjustable relative to each other when said clutch means disconnect said sections from each other to permit adjustment of said control members relative to the position of said carriage by adjusting the crank shaft over an angle of 360° and to permit the adjustment of the control members relative to the position of said die holder by adjusting said output shaft over an angle of 180°.

2. A press according to claim 1, which includes: ejector means reciprocable within said frame means for ejecting a completed workpiece, additional control means operatively connected to said ejector means for actuating the same, first transmission means drivingly connecting said motor means to said crank shaft and second transmission means drivingly connecting said crank shaft to said output shaft means, said additional control means being arranged behind said second transmission means and ahead of said clutch means when looking in the direction of the driving train from said motor means to said clutch means.

3. A press according to claim 2, which includes adjusting means for adjusting said additional control means relative to said carriage means.

4. A press according to claim 3, in which said adjusting means includes a cam adjustably connected to said output shaft means.

5. A press according to claim 1, in which said control means includes: additional shaft means drivingly connected to second control shaft section, free wheel clutch means operatively connected to said additional shaft means and feeding means, manually operable clutch means interposed between said feeding means and said free wheel clutch means, and means for locking said manually operable clutch means in response to the actuation of said feeding means.

References Cited

UNITED STATES PATENTS

| | | | |
|---|---|---|---|
| 2,377,097 | 5/1945 | Norris | 72—344 |
| 2,753,986 | 7/1956 | Morse | 72—349 |
| 3,078,566 | 2/1963 | Egan | 72—339 |
| 3,124,876 | 3/1964 | Patetti | 72—339 X |

GRANVILLE Y. CUSTER, Jr., Primary Examiner